United States Patent [19]

Denny

[11] 4,007,605
[45] Feb. 15, 1977

[54] REFRIGERATION SYSTEM AND CONTROL CIRCUIT

[75] Inventor: Dann W. Denny, Morrison, Ill.

[73] Assignee: General Electric Company, Fort Wayne, Ind.

[22] Filed: Feb. 10, 1975

[21] Appl. No.: 548,764

[52] U.S. Cl. .............................. 62/184; 73/362.8; 318/334

[51] Int. Cl.[2] ........................................ F25B 39/04

[58] Field of Search .......................... 62/184, 186; 236/DIG. 9, 78; 318/334, 345 H; 73/362.8, 349

[56] References Cited

UNITED STATES PATENTS

| | | | |
|---|---|---|---|
| 1,886,042 | 11/1932 | Osborne | 73/362.8 X |
| 2,565,350 | 8/1951 | Burns et al. | 236/78 X |
| 3,196,629 | 7/1965 | Wood | 62/183 |
| 3,208,235 | 9/1965 | Scott | 62/227 |
| 3,292,069 | 12/1966 | Evans, Jr. | 318/345 |
| 3,461,370 | 8/1969 | Canter | 318/227 |
| 3,478,532 | 11/1969 | Cootey et al. | 62/184 |
| 3,735,602 | 5/1973 | Ramsey | 62/184 |

*Primary Examiner*—William E. Wayner
*Attorney, Agent, or Firm*—Joseph E. Papin

[57] ABSTRACT

In a refrigeration system having at least a condensor with a plurality of coils for passage therethrough of a refrigerant of the system and means for directing air flow in a selected path over the condensor, there is provided means for attaining a weighted average of the temperatures of at least some of the coils and the air flow. The attaining means includes means disposed across at least some of the coils and generally in the path of the air flow for heat transfer therewith, respectively.

A method of attaining a weighted average temperature and a method of operating a refrigeration system are also disclosed.

19 Claims, 7 Drawing Figures

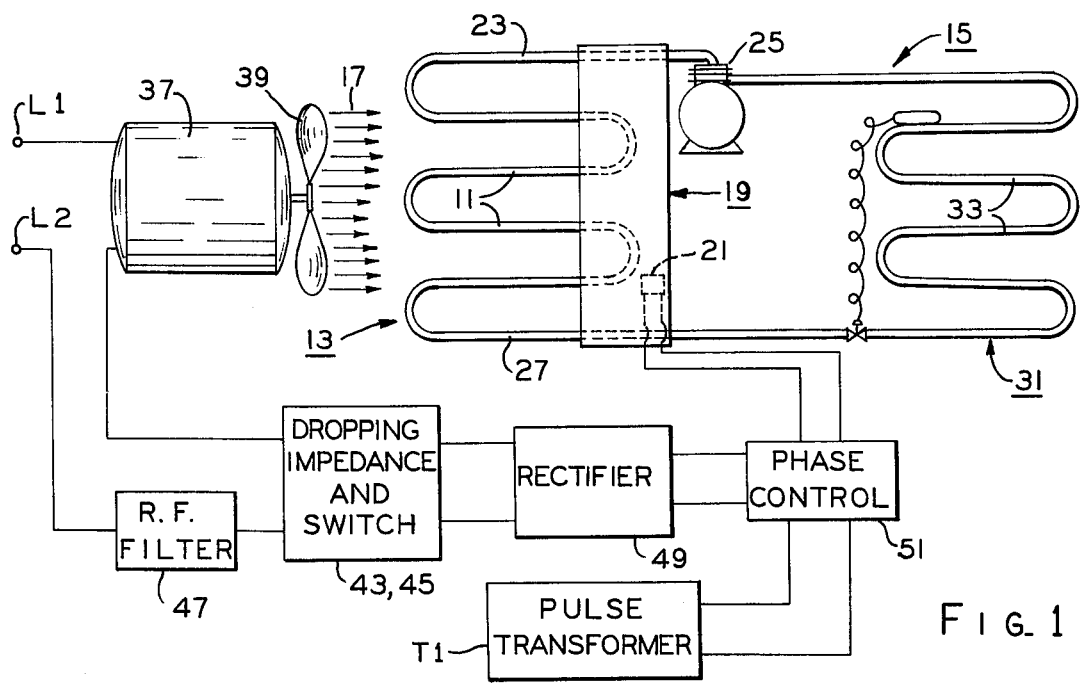

REFRIGERATION SYSTEM AND CONTROL CIRCUIT

BACKGROUND OF THE INVENTION

This invention relates generally to controls and in particular to a refrigeration system controlled in response to a weighted average temperature thereof, a method of attaining a weighted average temperature in a refrigeraton system, and a method of operating a refrigeration system.

In the past, various types of refrigeration systems and controls therefor have been utilized for cooling a given space. In general, the past refrigeration systems were provided with an expansion valve for the expansion of a liquid refrigerant supplied thereto from a condensor into a gaseous state which was then delivered through an evaporator for cooling purposes to a compressor. The compressor pumped the system refrigerant through a plurality of coils in the condensor where it was condensed back to its liquid state. A fan motor was also utilized in the refrigeration system to flow ambient air generally in a path over the coils of the condensor to aid in the condensation of the generally gaseous refrigerant flowing through the condensor coils from the compressor toward the expansion valve. It is well known that the efficiency of a refrigeration system may be impared thereby to create other problems if the condensor temperature varies substantially from a preferred or selected temperature valve or a temperature valve range.

It is desirable to pass enough air over the condensor coils to maintain the refrigerant in a gaseous state generally at the compressor end portion of the condensor coils and in a liquid state generally at the expansion valve end portion of the condensor coil for supplying the liquid refrigerant to the expansion valve. Of course, the amount of air flowed by the fan motor over the condensor coils to maintain this balance between the gaseous and liquid phases of the refrigerant in the compressor coils is a function of the temperature of the ambient air flowed by the fan motor over the condensor. By properly controlling the speed of the fan motor, the head pressure of the compressor may be maintained generally constant thereby to provide proper refrigerant pressure at the inlet side, i.e. the condensor side, of the expansion valve. One such related circuit for controlling the speed of a fan motor is disclosed in my copending application Ser. No. 548765 filed Feb. 10, 1975.

In some of the past refrigeration systems, the condensor coil was tapped or communicated with a pressure responsive device which was operably connected with means for varying the speed of the system fan motor. At least one of the disadvantageous or undesirable features of this past type of system and motor fan speed controlling scheme was the creation of another joint or tie into the system which increased the possibility of refrigerant leakage therefrom. Another disadvantageous or undesirable feature of this past type of system and fan motor speed controlling scheme was that another mechanically operating mechanism was included thereby to increase the likelihood of system failure due to mechanical malfunctions.

In other past refrigeration systems, the temperature of the condensor coil was utilized for controlling fan motor speed since such temperature may be correlated with the pressure of the refrigerant in the system in an attempt thereby to maintain the head pressure of the compressor generally constant. In many of this past type refrigeration systems and fan motor speed controlling schemes, the condensor coil temperature was measured at a selected location generally defining the interface of the gaseous and liquid phases of the refrigerant in the condensor coils by means, such as a thermistor or the like, attached by various suitable means to the condensor coil sensing the temperature at the phase interface. At least one of the disadvantageous or undesirable features of this particular past type of refrigeration system and fan motor speed control scheme is believed to be that the interface of the gaseous and liquid phases of the refrigerant varied location-wise in the condensor coil wherein the temperature sensing means in its selected phase interface location on the coil was subjected to temperatures of the refrigerant other than that selected at the phase interface thereof.

SUMMARY OF THE INVENTION

Among the several objects of the present invention may be noted the provision of a novel refrigeration system, a novel method of attaining a weighted average temperature in a refrigeration system, and a novel method of operating a refrigeration system which overcome the disadvantageous or undesirable features discussed hereinabove, as well as others, with respect to the prior art; the provision of such refrigeration system and such methods having means for effecting a weighted average of the respective temperatures of the condensor coils and the ambient air flow thereover in the system; the provision of such refrigeration system and such methods in which the air flow over at least some of the condensor coils in the system is controlled with respect to a selected weighted average of the temperature of the at least some condensor coils and the temperature of ambient air flowed thereover; and the provision of such refrigeration system and such methods having components which are simplistic in design, economical to manufacture, and easily assembled. Other objects and advantageous features of the present invention will be in part apparent and in part pointed out hereinafter.

In general and in one form of the invention, a refrigeration system has at least a condensor with a plurality of coils for passage therethrough of a refrigerant of the system and means for directing an ambient air flow generally in a selected path over the condensor. Means is provided for attaining a weighted average of the temperatures of at least some of the coils and the air flow and includes means disposed across at least some of the coils and generally in the path of the air flow for heat transfer therewith, respectively.

In general, a method in one form of the invention is provided for attaining a weighted average of the respective temperatures of at least some of a plurality of coils of a condensor for carrying a refrigerant of a refrigeration system and ambient air adapted to be flowed generally in a selected path past the condensor over the at least some coils thereof. In this attaining method, means is disposed across the at least some coils and generally in the path of the ambient air for heat transmitting relation therewith, respectively, and means for sensing temperature is coupled to the heat transmitting means at a predetermined location thereon with respect to the at least some coils and the path of the ambient air at which the average weighted temperature may be sensed.

Further in general, a method in one form of the invention is provided for operating a refrigeration system having a variable speed alternating current fan motor adapted to flow ambient air over a plurality of coils of a condensor for carrying a refrigerant of the system so as to regulate the temperature of the condensor. In this operating method, a temperature is sensed which is a weighted average of the respective temperatures of the at least some of the coils and the ambient air flowed in its path over the at least some coils. The speed of the fan motor is varied in accordance with any variation between the sensed weighted average temperature and a selected weighted average temperature for effecting the regulation of the condensor temperature.

BRIEF DESCRIPTION OF THE DRAWINGS

FIG. 1 is a schematic representation of a refrigeration system in one form of the invention and which illustrate principles for practicing methods of the invention respectively in one form thereof;

FIG. 2 is a more detailed schematic diagram of the electrical components of FIG. 1;

FIGS. 3 and 4 are fragmentary views taken from FIG. 1 showing in one form of the invention means for attaining a weighted average temperature of the condensor coils and ambient air flow thereover in one form; and FIGS. 5a, 5b and 5c illustrate exemplary current and voltage wave forms which may be achieved in the system and circuit of FIGS. 1 and 2.

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the invention.

DETAILED DESCRIPTION OF THE PREFERRED EMBODIMENTS

Referring now to the drawings in general, there is illustrated a method in one form of the invention for attaining a weighted average of the respective temperatures of at least some of a plurality of coils 11 of a condensor 13 for carrying a refrigerant (not shown) of a refrigeration system 15 and ambient air, indicated by a plurality of arrows 17, adapted to be flowed generally in a selected path past the condensor over the at least some coils 11 thereof (FIG. 1). In this weighted average temperature attaining method, means, such as a metallic member 19, is disposed across the at least some coils 11 and generally in the path of the ambient air 17 for heat transmitting engagement therewith, respectively, and means, such as a temperature sensitive resistor or a thermistor 21 or the like, for sensing temperature is coupled to heat transmitting means or metallic member 19 at a predetermined location thereon with respect to coils 11 and the ambient air flow 17 at which the weighted average temperature may be sensed (FIGS. 1, 3 and 4).

More particularly and with specific reference to FIGS. 1, 3 and 4, metallic member 19 is shown for purposes of disclosure as a generally rectangular, flat, thin strip or plate of any particular metal having good thermal or heat transferring or conductive properties; however, it is contemplated that the metallic member may be provided in various shapes and configurations within the scope of the invention so as to meet the objects and advantageous features thereof. Metallic member 19 extends across coils 11 in heat transferring relation or heat transmitting engagement therewith spanning from a first condensor coil 23 which is communicated with the outlet or pressure head side of a compressor 25 of system 15 to a last condensor coil 27 which is communicated with the inlet side of an expansion valve 29 of the system. An evaporator 31 has a plurality of cooling coils 33 interposed between the outlet side of expansion valve 29 and the inlet side of compressor 25. While metallic member 19 is illustrated as extending in heat transmitting engagement across all of coils 11, it is contemplated that the metallic member could span any selected number of the coils so as to properly attain the weighted average temperature, as discussed in detail hereinafter, within the scope of the invention so as to meet the objects and advantageous features thereof. Coils 11 and metallic member 19 are coupled together in the aforementioned heat transferring engagement by suitable means, such as soldering at 35 or the like; however, it is contemplated that other coupling materials or coupling methods may be utilized to couple the coils to the metallic member within the scope of the invention so as to meet the objects and advantageous features thereof.

As well known in the art, a refrigerant in its gaseous state and at a relatively high temperature is received from evaporator 31 by compressor 25 which then compresses the gaseous refrigerant to increase the pressure thereof, i.e., the head pressure of system 15, to a selected value at which the system is designed to operate most efficiently. the compressed gaseous refrigerant flows from compressor 25 through condensor 13 where it condenses back to its liquid state for delivery to expansion valve 29. At expansion valve 29, the relatively hot liquid refrigerant is expanded back into its gaseous state thereby to cool the refrigerant, and the relatively cool gaseous refrigerant is then passed through evaporator 31 for cooling a given space (not shown). In the performance of its cooling function or operation in evaporator 31, the gaseous refrigerant, of course, is again heated and returns to the inlet side of compressor 25 for recirculation through system 15.

As previously mentioned, the temperature of condensor 13 is correlative with the head pressure of compressor 25 in system 15, and it is desirable to maintain the condensor temperature generally at a predetermined temperature or within a predetermined temperature range thereby to maintain the compressor head pressure at a generally constant predetermined value for compressor 25 which will, of course, maximize the efficiency of system 15, as is well known in the art. However, at any given or selected location on metallic member 19, the temperature thereof may vary depending, of course, on the spaced relation of such location with respect to coils 11 and the path of the ambient air flow 17. As a result, it is necessary to predeterminately locate thermistor 21 on metallic member 19 with respect to coils 11 and the flow path of the ambient air in order that the thermistor may sense a temperature value which is, in fact, a predetermined or desired weighted average of the respective temperatures of coils 11 spanned by the metallic member and the ambient air 17 flowed past condensor 13 when system 15 is operated generally at the maximum efficiency and head pressure for which it was designed. This predetermined location of thermistor 21 on metallic member 19 may vary with respect to the type of system and its required operating characteristics. However, the position or predetermined location of thermistor 21 on metallic member 19 wherein generally about two-thirds to about five-eights of the temperature of the metallic member is determined by the temperature of coils 11 and approximately one-third to approximately three-eights of the temperature of the metallic member is determined by the ambient air flow 17 past condensor 13 has been found to be satisfactory to provide the desired weighted average temperature to be sensed by the thermistor. Of course, once the predetermined location of thermistor 13 on metallic member 19 has been ascertained to effect the desired weighted average temperature for maintaining generally constant the efficiency and head pressure of compressor 25 in any particular system, such as system 15, then such predetermined location may be utilized with respect to the manufacture and assembly of other condensors for use in such particular system. To complete the discussion with respect to the predetermined location of thermistor 21 on metallic member 19 in system 15, it may be noted that the thermistor is positioned on the metallic member downstream of condensor 13 with respect to the path of ambient air 17 passed through the condensor, and it may be desirable to position the thermistor so as to be, at least in part, protected or shielded from the ambient air flow 17.

Referring now again to the drawings in general, in refrigeration system 15 there is provided in one form of the invention at least condensor 13 having coils 11 for passage therethrough of a refrigerant (not shown) of the system, and means, such as a variable speed alternating current fan motor 37, is operable generally for directing ambient air flow 17 in a preselected path past or through the condensor upon the occurrence of certain conditions (FIG. 1). In this system 15, means for attaining a weighted average of the temperatures of at least some of coils 11 and the ambient air flow 17 is generally constituted by means, such as metallic member 19, disposed across at least some of coils 11 and generally in the path of the ambient air flow for heat transfer therewith, respectively (FIGS. 1, 3 and 4).

More particularly, fan motor 37 may be of any type well known to the art in which the speed thereof may be varied, and a fan or fan blade 39 is mounted to a rotatable shaft of the motor for driving or directing the ambient air flow through condensor 13, as shown in FIG. 1. Thermistor 21 may be coupled to metallic member 19 at the predetermined location thereon with respect to condensor coil 11 and the ambient air flow 17, as discussed above.

In addition, system 15 is implemented with means, such as a circuit 41 shown in FIGS. 1 and 2 and discussed in detail hereinafter, for controlling or varying the speed of fan motor 37. Circuit 41 is responsive to the temperature sensed by thermistor 21 for varying the speed of air flowing means or fan motor 37 to effect the regulation of the temperature of the condensing means or condensor 13. As previously mentioned, thermistor 21 is predeterminately located on metallic member 19 generally downstream of condensor coils 11 with respect to the path of the ambient air flow 17 through condensor 13 for sensing the weighted average temperature of both the condensor coils and the ambient air flow. Upon the occurrence of the aforementioned certain or preselected conditions, such as for instance the drifting of the temperature sensed by thermistor 21 from the predetermined or desired weighted average temperature, the thermistor is operable generally to signal such temperature drift to circuit 41. In response to the signals of thermistor 21, circuit 41 is operable generally to vary, i.e., to increase or decrease, the speed of fan motor 37 so that the ambient air flow 17 generated by fan 39 is correspondingly varied. In this manner, variations in the speed of fan motor 37 results in a corresponding variation of the ambient air flow 17 through condensor 13, and the temperature of the condensor is regulated by the cooling action of the ambient air flow 17 on condensor coils 11 and metallic member 19 to correct or compensate for any drift from the desired weighted average temperature.

Circuit 41 is provided for controlling the speed of variable speed fan motor 37, as previously mentioned, and the fan motor may be energized across a pair of line terminals L1, L2 which are adapted to be connected to a source of alternating current, such as for instance a standard 230 A.C. source or the like, as illustrated in FIGS. 1 and 2. In series relation with fan motor 37 across line terminals L1, L2 is a dropping impedance, such as a resistor 43, and a bidirectional solid state control rectifier or switch, such as a triac 45 or the like, is coupled in parallel relation across the dropping impedance and also in series relation with the fan motor across the line terminals. Switch 45 is a gate controlled full wave alternating current switch designed to switch from a blocking or nonconducting state to a conducting state for either polarity of alternating current voltage applied thereto with either positive or negative gating; however, as employed in circuit 41 only negative gate triggering is required. It may be noted that the parallel combination of dropping impedance 43 and switch 45 are operable generally to effect the regulation or variation of the speed of fan motor 37 generally as a function of the weighted average temperature sensed by thermistor 21 through metallic member 19, as previously mentioned. Fan motor 37 is, of course, operated at its lowest speed mode when switch 45 is nonconducting wherein current flows across line terminals L1, L2 through the series combination of dropping impedance 43 and the fan motor. The operation of circuit 41 may be better understood by considering FIG. 1 in conjunction with FIG. 2 wherein dropping impedance 43 and switch 45 have been enclosed in numbered dotted lines as are a radio frequency filter 47, a rectifier 49, and a phase control unit or circuit 51.

Assuming that the weighted average temperature of condensor 13 and the ambient air flow 17 as sensed by thermistor 21 through metallic member 19 has drifted or varied upwardly so as to be greater than the desired weighted average temperature, fan motor 27 will continue to be supplied with energizing current by way of dropping impedance 43. Rectifier 49 may be constituted by diodes 55, 57, 59 and 61 respectively connected in a simple diode bridge circuit which provides at its output terminals a pulsating direct current, as well known in the art, to phase control circuit 51. A zener diode 63 may be provided across the output of rectifier 49 to limit the peak values of the pulsating direct current to a preferred value thus providing a voltage regulated power source for phase control circuit 51.

At the beginning of either positive or negative excursions of voltage across dropping impedance 43, the voltage across zener diode 63 begins a positive excursion toward and shortly reaches its regulated maximum value. This zener voltage is applied across a voltage divider circuit generally constituted by a pair of resistors 65, 67, and a fixed fraction of the zener voltage appears at a gate 69 of another solid state switch, such as programmable unijunction transistor 71 or the like. Another voltage divider circuit is generally constituted by thermistor 21 and a variable resistor 73, and this second voltage divider circuit determines a second voltage which is less than the zener voltage and which is applied by way of another diode 75 to the upper terminal of a capacitor 77. In this manner, the charge on capacitor 77 can never exceed the voltage value across the second voltage divider circuit, i.e. across thermistor 21 and variable resistor 73. As the voltage across zener diode 63 begins its positive excursions, capacitor 73 begins to charge by way of a resistor 79 and thermistor 21. If and when the voltage across capacitor 77 exceeds the breakdown voltage of programmable unijunction transistor 71, as determined by the voltage divider potential on gate 69 thereof, the programmable unijunction transistor will conduct thereby to discharge capacitor 77 and induce a pulsewave form in a primary winding 81 of a pulse transformer T1. This induced pulse is fed back by way of pulse transformer T1 to a gate 83 of switch 45 thereby to trigger it to its conductive state and effectively short out or by-pass dropping impedance 43 wherein full line voltage may be supplied through the switch to fan motor 37 to effect operation thereof at a greater or increased speed. Diode 85 may be provided in series relation with another or a secondary winding 87 of pulse transformer T1 and switch gate 83 to prevent spurious control of switch 45.

So long as switch 45 is nonconductive, fan motor 37 receives only partial line voltage by way of dropping impedance 43; however, when the switch is conductive, full line voltage may be supplied to the fan motor, as discussed above. Considering now one-half cycle of the voltage across dropping impedance 43, if switch 45 begins conducting shortly after the beginning of the half-cycle, fan motor 37 will receive nearly full energizing current. However, if switch 45 does not conduct until late in the half-cycle, fan motor 37 will receive generally less current, and the speed of the fan motor will closely approximate the lowest speed operating mode thereof wherein the fan motor is continuously energized only across dropping impedance 43, as previously mentioned. Variations in the time at which switch 45 first conducts in the half-cycle therefore is employed to effect corresponding variations in the speed of fan motor 37.

It was earlier assumed that the weighted average temperature of condensor 13 and the ambient air flow 17 as measured by thermistor 21 through metallic member 19 exceeded the desired weighted average temperature at which system 15 is designed to operate, and as discussed above, circuit 41 was operable generally to increase the speed of fan motor 37 and the cooling effect of fan 37. In this manner, the increased speed of fan motor 37 correspondingly effects an increase in the value of the ambient air flow 17 which, in turn, acts to cool or reduce the temperature of condensor 13 so that weighted average temperature of the condensor and the ambient air flow is returned to approximate the value of the desired weighted average temperature.

If the weighted average temperature of condensor 13 and the ambient air flow 17 as measured by thermistor 21 through metallic member 19 decreases or drifts below the desired weighted average temperature at which system 15 is designed to operate, the resistance of the thermistor will increase thus lowering the voltage divider potential at the cathode of diode 75. In this manner, the "full charge" for capacitor 77 is now at a generally lower voltage. This decrease in the voltage for the capacitor 77 of course also increases the time constant for the capacitor circuit with any particular voltage value being reaches later. Therefore, the breakdown voltage of programmable unijunction transistor 71 will be reached later and the pulse fed back to gate 83 of switch 45 later for each cycle. Thus, switch 45 is conducting for a lesser portion of each cycle to supply a lesser amount of energy to fan motor 37 thereby to decrease the speed thereof and the cooling effect of fan 39, as desired. In this manner, correction or compensation provided by circuit 41 to reduce the speed of fan motor 37 and the cooling effect of fan 39 correspondingly effects a reduction of the ambient air flow 17 through condensor 13 which, in turns, permits the temperature of the condensor to increase so that weighted average temperature of the condensor and the ambient air flow is returned to approximately the value of the desired weighted average temperature.

In each of FIGS. 5a, 5b and 5c, a reference or zero level of voltage or current is represented by a horizontal line, and for reference purposes, the voltage applied across line terminals L1, L2 is shown in dotted lines. The solid line wave forms are representative of total line current under different conditions and therefore different motor speeds. So long as switch 45 is non-conducting, motor 37 has the line voltage across dropping resistance 43 and is running in its slower speed mode, as illustrated in FIG. 5a; however, when the switch is conducting, full line voltage is applied across the motor, and it runs in its higher speed mode as illustrated in FIG. 5c. As previously discussed hereinbefore, variations in the time at which switch 45 conducts in the half-cycle is employed to effect corresponding variations in the speed of fan motor 37, as may be illustrated in FIG. 5b.

Referring now again in general to the drawings, it may be noted that a method in one form of the invention is also provided for operating system 15 in which variable speed alternating current fan motor 37 is adapted to flow ambient air 17 oven coils 11 of condensor 13 for carrying a refrigerant (not shown) of the system so as to regulate the temperature of the condensor (FIG. 1). In this operating method, a temperature is sensed which is a weighted average of the respective temperature of at least some of coils 11 and the ambient air flow 17 in a path over the at least some coils (FIGS. 1 and 2). The speed of fan motor 39 is varied in accordance with any variation between the sensed weighted average temperature and a selected weighted average temperature for effecting the regulation of the condensor temperature.

Further, there is also illustrated a method of controlling the speed of an alternating current motor, such as fan motor 37 for instance. In this speed controlling method, means, such as switch 45, adapted to be rendered conductive in either direction of the alternating current is coupled in parallel with dropping impedance 43 for motor 37 and in series with the motor for by-passing the dropping impedance and for passing energy to the motor. Signals are provided to means, such as phase circuit 51, for controlling the by-passing and passing means or switch 45 indicative of the occurrence of certain or preselected conditions for rendering it conductive and for controlling the conduction thereof thereby to effect the passage of the energy to motor 37 for varying the speed thereof in accordance with the occurrence of the certain conditions.

From the foregoing, it may be noted that control circuit 41 is never subjected to a voltage greater than the voltage drop across dropping impedance 43 which typically may be generally about one-half the line voltage; therefore, components with lower voltage rating which are correspondingly less expensive may be employed in the circuit thereby to reduce the overall cost thereof. Also, there is very little current flow through sensing thermistor 21 wherein its accuracy is not impaired by the heating affect of control current flowing therethrough. Rectifier circuit 49 has the current flow therethrough limited by resistor 53 and further does not carry motor current thus allowing the use of relatively inexpensive diodes 55, 57, 59 and 61. The use of metallic member 19 generally as a heat sink to attain the weighted average temperature for condensor coils 11 and the ambient air flow 17 provides a more accurate and representative temperature indication for the operation of system 15, and metallic member 19 is not sensitive to transient temperature variations or localized temperature conditions at any one location on the condensor coils.

The following illustrates component values which may be employed for the electronic components of circuit 41.

C1,77 .... 0.1 uf, 200 v.
21 .... 5K ohms at 25° C.
55,57,59,61,75,85 .... 200 v, 0.75 amp.
63 .... 20 v, 1 w.
65,67 .... 3.3K ohms, 0.5 w.
73 .... 0-10K ohms, 0.5 w.
79 .... 150K ohms, 0.5 w.
R3 .... 100 ohms, 0.5 w.
43 .... 55 ohms, 500 w.
45 .... 200 v.
53 .... 10K ohms, 5 w.

It is now apparent that a novel refrigeration system 15, a novel method of attaining a weighted average temperature, and a novel method of operating a refrigeration system have been presented meeting the objects and advantageous features set out hereinbefore, as well as others. Further, it is contemplated that variances in the precise manner of practicing these methods and that changes as to the arrangements, shapes, details and connections of the component parts of system 15 which have been presented to illustrate the invention in one form thereof, may be made by those having ordinary skill in the art without departing from the spirit of the invention or the scope thereof as set out in the claims which follow.

What I claim as new and desire to secure by Letters Patent of the United States is:

1. A refrigeration system for conditioning air in a space, a condensor generally isolated from the space and having a plurality of coils for passage therethrough of a refrigerant of the system, means operable generally at different speeds for flowing ambient air in a preselected flow path past the condensor so as to regulate the temperature thereof, means responsive to the temperatures of the condensor and the ambient air in the preselected flow path thereof for controlling the speed operation of the flowing means; the improvement wherein the controlling means includes a metallic member engaged in heat transfer relation across at least some of said condensor coils and disposed in heat transfer relation with the ambient air in the preselected flow path thereof generally downstream of said condensor with respect to said flowing means so as to attain a weighted average of the respective temperatures of said at least some condensor coils and the ambient air in the preselected flow path thereof downstream of said condensor, and means predeterminately disposed on said metallic member with respect to said at least some condensor coils and the preselected flow path of the ambient air downstream of said condensor for sensing the weighted average temperature.

2. A refrigeration system for conditioning air in a space comprising means for pumping a refrigerant through said system; means generally isolated from the conditioned air in the space for condensing the refrigerant including a plurality of coils for carrying the refrigerant of said system; means operable generally at different speeds for flowing ambient air over said condensing means to regulate the temperature thereof; means for controlling the speed of said flowing means including means engaged in heat transfer relation across at least some of said coils of said condensing means and disposed in the path of the air flow over said at least some coils of said condensing means generally downstream thereof with respect to said flowing means for attaining a weighted average of the respective temperatures of said at least some coils and the air flow downstream of said condensing means, means predeterminately located on said attaining means with respect to said at least some coils and the air flow downstream of said condensing means for sensing the weighted average temperature and operable generally to provide a signal in the event the sensed weighted average temperature varies from a predetermined value therefor, and means coupled with said sensing means and operable generally upon the occurrence of its signal for varying the speed of said flowing means so as to effect the temperature regulation of said condensing means.

3. A refrigeration system as set forth in claim 2, wherein said attaining means comprises a metallic member defining a heat sink for said at least some coils and the air flow downstream of said condensing means.

4. A refrigeration system as set forth in claim 2 wherein said attaining means comprises by a metallic member engaged in the heat transfer relation with said at least some coils and extending between a first coil and at last coil thereof in the path of the air flow.

5. A refrigeration system as set forth in claim 2, wherein said air flowing means comprises an alternating current fan motor, and said controlling means further including a dropping impedance in series relation with said fan motor and adapted to be energized from an alternating current source for said fan motor, and said speed varying means being coupled across said dropping impedance.

6. A refrigeration system as set forth in claim 5, wherein said speed varying means includes a gate controlled full wave alternating current switch for by-passing said dropping impedance when said switch is conducting in either direction to control the energy delivered to said fan motor for varying the speed thereof.

7. A refrigeration system as set forth in claim 2, wherein said speed varying means comprises a gate controlled fullwave alternating current switch, the gate of said switch being responsive to the signal of said sensing means to control the duration of the conduction of said switch and thereby vary the speed of said flowing means so as to effect the regulation of the condensing means temperature.

8. A refrigeration system as set forth in claim 7 wherein said controlling means further includes a phase circuit coupled with said sensing means, and means for coupling said phase circuit to the gate of said switch to control the duration of its conduction in response to the signal of said sensing means.

9. A refrigeration system comprising a condensor having a plurality of coils for the passage therethrough of a refrigerant of said system; an alternating current fan motor for flowing air past said condensor over said coils thereof to regulate the temperature of said condensor; means for attaining a weighted average of the respective temperatures of at least some of said coils and of the air flowed over said condensor, said attaining means comprising a metallic member disposed in heat transferring engagement across said at least some coils and in the path of the air flowed past said condensor downstream thereof; and means for controlling the speed of said fan motor thereby to regulate the temperature of said condensor including an energizing circuit having at least said fan motor and a dropping impedance coupled in series relation therein and adapted to be energized from an alternating current source, a phase control circuit including means predeterminately disposed on said attaining means with respect to said at least some coils and the air flow path for sensing the weighted average temperature of said attaining means and for providing signals indicative of a variance thereof from a preselected weighted average temperature of said at least some coils and the air flow thereover, means for coupling said energizing circuit to said phase control circuit to provide it with a pulsating direct current, gate controlled full wave alternating current switch means coupled in series relation with said fan motor and in parallel relation with said dropping impedance to effectively by-pass it when said switch means is conducting in either direction to control the energy delivered to said fan motor for varying its speed and thereby effecting the regulation of the temperature of said condensor, and means for coupling said phase control circuit to the gate of said switch means to transmit thereto the indicative signals of said sensing means, the indicative signals being operable generally to control the duration of the conduction of said switch means inversely with respect to the weighted average temperature of said attaining means therefor.

10. A method of attaining a weighted average of the respective temperatures of at least some of a plurality of coils of a condensor for carrying a refrigerant of a refrigeration system and ambient air adapted to be flowed generally in a preselected path past the condensor over the at least some coils thereof comprising the steps of:
  a. disposing means across the at least some coils and generally in the preselected path of the ambient air downstream of the condensor for heat transmitting relation with both the at least some coils and the ambient air flowed in the preselected path thereof; and
  b. coupling means for sensing temperature to the heat transmitting means at a predetermined location thereon with respect to the at least some coils and the preselected path of the ambient air so that the temperature of the heat transmitting means sensed by the sensing means is the weighted average of the respective temperatures of the at least some coils and the ambient air flowed in the preselected path thereof.

11. The method as set forth in claim 10 wherein the disposing step includes placing the heat transmitting means at least in heat conductive engagement with the at least some coils.

12. The member as set forth in claim 10 wherein the heat transmitting means comprises a metallic member.

13. A method of operating a refrigeration system having a variable speed alternating current fan motor adapted to flow ambient atmospheric air over a plurality of coils of a condensor for carrying a refrigerant of the system so as to regulate the temperature of the condensor comprising the steps of:
  a. sensing at a preselected location on a metallic member engaged in heat transfer relation a cross at least some of the coils and disposed on the downstream side of the condenser in heat transfer relation with the air flowed over the coils an instantaneous weighted average of the respective temperatures of the at least some coils and the air flowed in a path over the coils; and
  b. varying the speed of the fan motor in accordance with a variance of the sensed instantaneous weighted average temperature with respect to a predetermined value for effecting the regulation of the condensor temperature.

14. The method as set forth in claim 13 wherein the sensing step includes providing electrical signals indicative of the sensed instantaneous weighted average temperature to means for controlling the amount of energy supplied to the fan motor thereby to vary the speed of the fan motor in the varying step.

15. A refrigeration system comprising means for pumping a refrigerant through said system; means for condensing the refrigerant including a plurality of coils for carrying the refrigerant; means for flowing air over said condensing means to regulate the temperature thereof; and means for controlling the speed of said air flowing means including means disposed in heat transfer relation with at least some of said coils and generally in the path of the air flow over said condensing means downstream thereof for attaining a weighted average of the temperatures of said at least some coils and the downstream air flow, said attaining means comprising a metallic member disposed in the heat transfer relation with said at least some coils and extending between a first coil and a last coil thereof in the path of the downstream air flow, means predeterminately disposed on said attaining means with respect to said at least some coils and the downstream air flow for sensing the weighted average temperature, and means responsive to the weighted average temperature sensed by said sensing means for varying the speed of said air flowing means with respect to a preselected weighted average temperature for said condensing means and the downstream air flow to effect the regulation of the temperature of said condensing means.

16. A refrigeration system comprising means for pumping a refrigerant through said system; means for condensing the refrigerant including a plurality of coils for carrying the refrigerant; means for flowing air over said condensing means to regulate the temperature thereof including an alternating current fan motor; and means for controlling the speed of said fan motor including a dropping impedance disposed in series relation with said fan motor and adapted to be energized from an alternating current source for said fan motor, means disposed in heat transfer relation with at least some of said coils and generally in the path of the air flow over said condensing means downstream thereof for attaining a weighted average of the temperatures of said at least some coils and the downstream air flow, means predeterminately disposed on said attaining means with respect to said at least some coils and the downstream air flow for sensing the weighted average temperature, and a gate controlled full wave alterating current switch coupled across said dropping impedance and responsive to the weighted average temperature sensed by said sensing means for by-passing the dropping impedance when said switch is conducting in either direction so as to control the energy delivered to said fan motor for varying the speed thereof with respect to a preselected weighted average temperature of said condensing means and the downstream air flow to effect the regulation of the temperature of said condensing means.

17. A refrigeration system comprising means for pumping a refrigerant through said system; means for condensing the refrigerant including a plurality of coils for carrying the refrigerant; means adapted to be energized by alternating current supplied thereto for flowing air over said condensing means to regulate the temperature thereof; and means for controlling the speed of the air flowing means including means disposed in heat transfer relation with at least some of said coils and generally in the path of the air flow over said condensing means downstream thereof for attaining a weighted average of the temperature of said at least some coils and the downstream air flow, means predeterminately disposed on said attaining means with respect to said at least some coils and the downstream air flow for sensing the weighted average temperature, a phase circuit adapted to be energized from the alternating current supplied to said flowing means, said sensing means being coupled in said phase circuit, a gate controlled full wave alternating current switch coupled with said flowing means for varying the speed thereof, and means for coupling said phase circuit to the gate of said switch to control the duration of the conduction of said switch with respect to the weighted average temperature sensed by said sensing means and thereby vary the speed of said flowing means for effecting the regulation of said condensing means temperature.

18. A refrigeration system comprising means for pumping a refrigerant through said system; means for condensing the refrigerant including a plurality of coils for carrying the refrigerant; means for flowing air over said condensing means to regulate the temperature thereof; and means for controlling the speed of said air flowing means including means disposed in heat transfer relation with at least some of said coils and generally in the path of the air flow over said condensing means downstream thereof for attaining a weighted average of the temperatures of said at least some coils and the dowstream air flow, means predeterminately disposed on said attaining means with respect to said at least some coils and the downstream air flow for sensing the weighted average temperature, and a gate controlled full wave alternating current switch having its gate coupled with said sensing means to control the duration of the conduction of said switch with respect to the weighted average temperature sensed by said sensing means for varying the speed of said air flowing means with respect to a preselected weighted average temperature of said condensing means and the downstream air flow to effect the regulation of the temperature of said condensing means.

19. A refrigeration system comprising means for pumping a refrigerant through said system; means for condensing the refrigerant including a plurality of coils for carrying the refrigerant; means for flowing air over said condensing means to regulate the temperature thereof including an alternating current motor; and means for controlling the speed of said motor means including a phase circuit operable generally in response to alternating current supplied to said motor, means disposed in heat transfer relation with at least some of said coils and generally in the path of the air flow over said condensing means downstream thereof for attaining a weighted average of the temperature of said at least some coils and the downstream air flow, means coupled in said phase circuit and predeterminately disposed on said attaining means with respect to said at least some coils and the downstream air flow for sensing the weighted average temperature and operable generally to develop signals correlative of the sensed weighted average temperature, means responsive to the signals of said sensing means for varying the speed of said motor with respect to a preselected weighted average temperature for said condensing means and the downstream air flow to effect the regulation of the temperature of said condensing means, and means for transmitting the signals of said sensing means to said speed varying means.

* * * * *